(12) United States Patent
Yoneyama et al.

(10) Patent No.: US 6,853,363 B2
(45) Date of Patent: Feb. 8, 2005

(54) PROJECTION TYPE IMAGE DISPLAY APPARATUS

(75) Inventors: Kazuya Yoneyama, Saitama (JP); Yasuyuki Miyata, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 325 days.

(21) Appl. No.: 10/094,003

(22) Filed: Mar. 11, 2002

(65) Prior Publication Data

US 2002/0135540 A1 Sep. 26, 2002

(30) Foreign Application Priority Data

Mar. 13, 2001 (JP) ........................................ 2001-070445

(51) Int. Cl.[7] .............................. G09G 3/36; G09G 3/12; G02F 1/1335; G02B 26/08
(52) U.S. Cl. ............................... 345/97; 345/32; 349/9; 349/100; 359/301
(58) Field of Search ............................... 345/1.1–1.3, 4, 345/30, 32, 55, 84, 87, 88, 97, 690, 697, 102; 349/5, 7–9, 57, 61, 62, 64, 65, 78, 80, 81, 96–100, 104; 359/246, 247, 251, 263, 267, 272, 292, 301, 302, 308–310

(56) References Cited

U.S. PATENT DOCUMENTS

| | | | | |
|---|---|---|---|---|
| 5,565,933 A | * | 10/1996 | Reinsch ....................... | 348/742 |
| 6,262,851 B1 | * | 7/2001 | Marshall ...................... | 359/634 |
| 6,340,230 B1 | * | 1/2002 | Bryars et al. .................. | 353/31 |
| 6,390,626 B2 | * | 5/2002 | Knox ............................ | 353/20 |
| 6,624,862 B1 | * | 9/2003 | Hayashi et al. .............. | 349/119 |
| 6,650,377 B2 | * | 11/2003 | Robinson et al. ............... | 349/9 |

FOREIGN PATENT DOCUMENTS

JP  8-271855  10/1996

* cited by examiner

Primary Examiner—Bipin Shalwala
Assistant Examiner—Jeff Piziali
(74) Attorney, Agent, or Firm—Snider & Associates; Ronald R. Snider

(57) ABSTRACT

A projection type image display apparatus projects, under magnification by using a projection lens, image information carried by a luminous flux emitted from a ferroelectric liquid crystal display device. A field-sequential color-decomposing illumination optical system generates illumination color light for irradiating the ferroelectric liquid crystal display device. An analyzer and a quarter wave plate are arranged between the ferroelectric liquid crystal display device and the projection lens successively from the ferroelectric liquid crystal display device side.

5 Claims, 2 Drawing Sheets

PROJECTION TYPE IMAGE DISPLAY APPARATUS

RELATED APPLICATIONS

This application claims the priority of Japanese Patent Application No. 2001-70445 filed on Mar. 13, 2001, which is incorporated herein by reference.

BACKGROUND OF THE INVENTION

1. Field of the Invention

The present invention relates to a projection type image display apparatus which uses a small-sized ferroelectric liquid display device, and projects, under magnification with a high contrast by using a projection lens, image information carried by a luminous flux emitted from the ferroelectric liquid display device.

2. Description of the Prior Art

Various kinds of projection type image display apparatus by which a luminous flux carrying image information emitted from a liquid crystal display device is projected onto a screen under magnification by way of a projection lens have recently been known, and attention has been focused on those using a reflection type liquid crystal display device as their liquid crystal display device.

Meanwhile, an apparatus shown in FIG. 2 has been known as a projection type image display apparatus which projects a color image by using reflection type liquid display devices.

As shown in FIG. 2, by way of a polarization beam splitter (hereinafter referred to as PBS) 31, S-polarized light acting as illumination light enters a three-color-decomposing/combining prism 36, by which it is decomposed into three color light components of R, G, and B. The color light components are made incident on their corresponding reflection type liquid display devices 32A to 32C and are modulated in response to respective image input signals to the devices 32A to 32C. This modulation is effected such that pixels are turned ON in areas having a higher luminance (white image areas) but are turned OFF in areas having a lower luminance (black image areas). Luminous fluxes reflected by ON-state pixels are converted into P-polarized light, which then pass through the PBS 31, so as to be projected onto a screen by way of a projection lens 33. For enhancing the contrast of projected images, an analyzer 34 is inserted immediately in front of the projection lens.

When the light transmitted through the PBS 31 reaches the projection lens 33, it is reflected by each lens surface though with a very low intensity and, in a predetermined projection environment, may be re-reflected by the reflection type image display devices, so as to reach the screen. Namely, it may become stray light (ghost), thereby lowering the contrast.

As an apparatus which can improve the contrast on the screen in such a case 1 the technique disclosed in Japanese Unexamined Patent Publication No. 8-271855 has been known. It uses the configuration shown in FIG. 2 as a basic configuration, and inserts a quarter-wave plate 35 between the projection lens and the image display devices in order to improve the contrast.

The technique disclosed in the above-mentioned publication uses three image display devices and employs the color-decomposing/combining prism in addition to the polarization beam splitter, thereby increasing its weight and cost. While there has recently been a strong demand for reducing the weight and cost of the projection type image display apparatus, no dramatic improvement can be expected as long as the configuration of the above-mentioned prior art is employed. Reducing the number of image display devices is effective in terms of cost, whereas reducing the number of optical components (such as glass components like prisms) is effective in terms of weight.

SUMMARY OF THE INVENTION

In view of such circumstances, it is an object of the present invention to provide a projection type image display apparatus for projecting a color image by using a reflection type image display device, which can greatly reduce its cost and weight while yielding a favorable contrast.

The present invention provides a projection type image display apparatus which projects, under magnification by using a projection lens, image information carried by a luminous flux emitted from a reflection type image display device;

wherein the reflection type image display device is a ferroelectric liquid crystal display device;

wherein the apparatus comprises a field-sequential color-decomposing illumination optical system for generating illumination color light for irradiating the ferroelectric liquid crystal display device; and wherein an analyzer and a quarter wave plate are arranged between the ferroelectric liquid crystal display device and the projection lens successively from the ferroelectric liquid crystal display device side.

Preferably, a polarization beam splitter is arranged between the ferroelectric liquid crystal display device and the analyzer.

The polarization beam splitter may be configured so as to reflect S-polarized light and transmit P-polarized light therethrough.

In a space between the ferroelectric liquid crystal display device and the analyzer, the illumination color light may be made obliquely incident on the ferroelectric liquid crystal display device.

The field-sequential color-decomposing illumination optical system may be color wheel means or color switch means.

DESCRIPTION OF THE PREFERRED EMBODIMENTS

In the following, a specific example of the projection type image display apparatus in accordance with an embodiment of the present invention will be explained with reference to a drawing.

Figure 1:
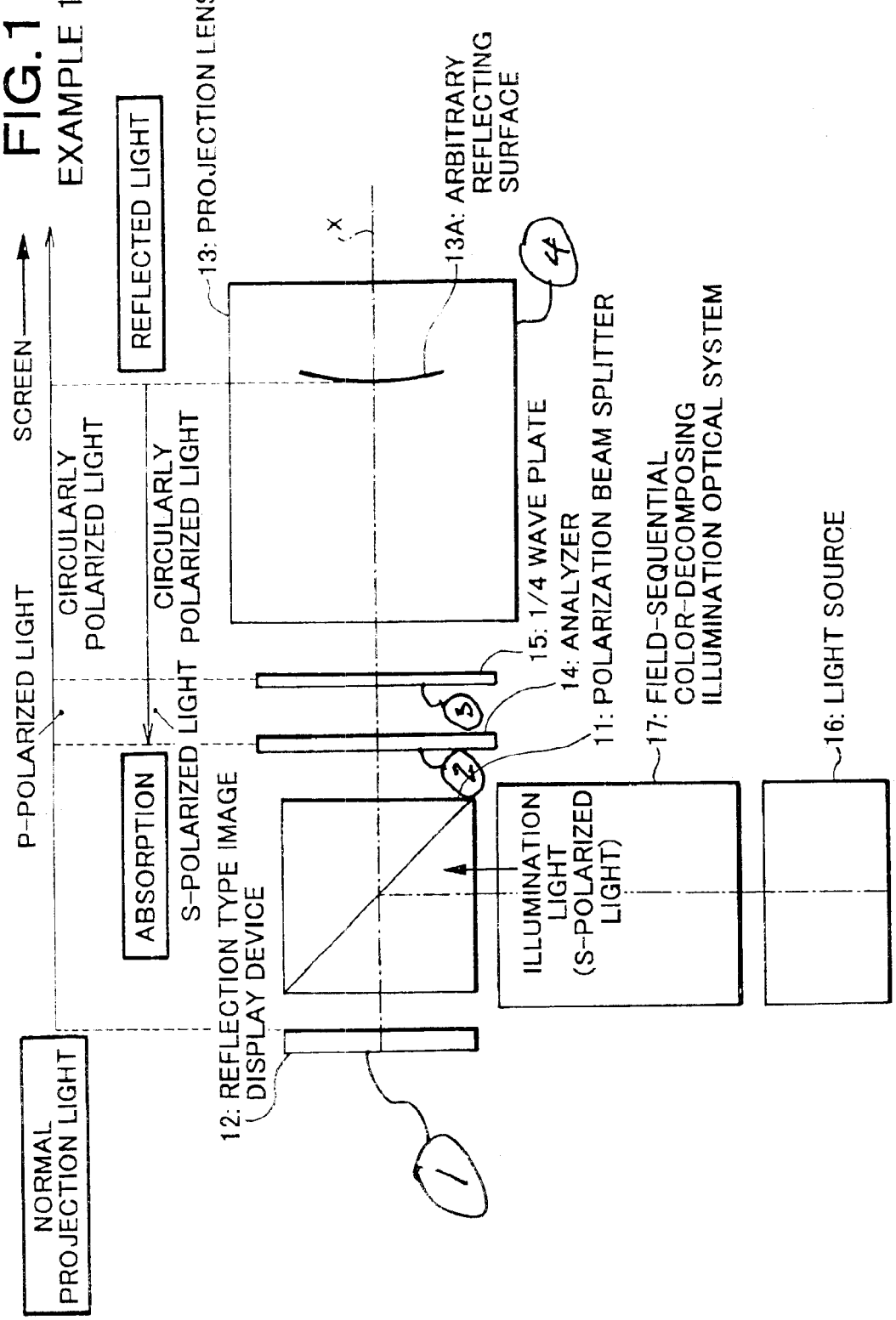
FIG. 1 is a schematic view showing a main part of the projection type image display apparatus in accordance with an example of the present invention.
Figure 2:
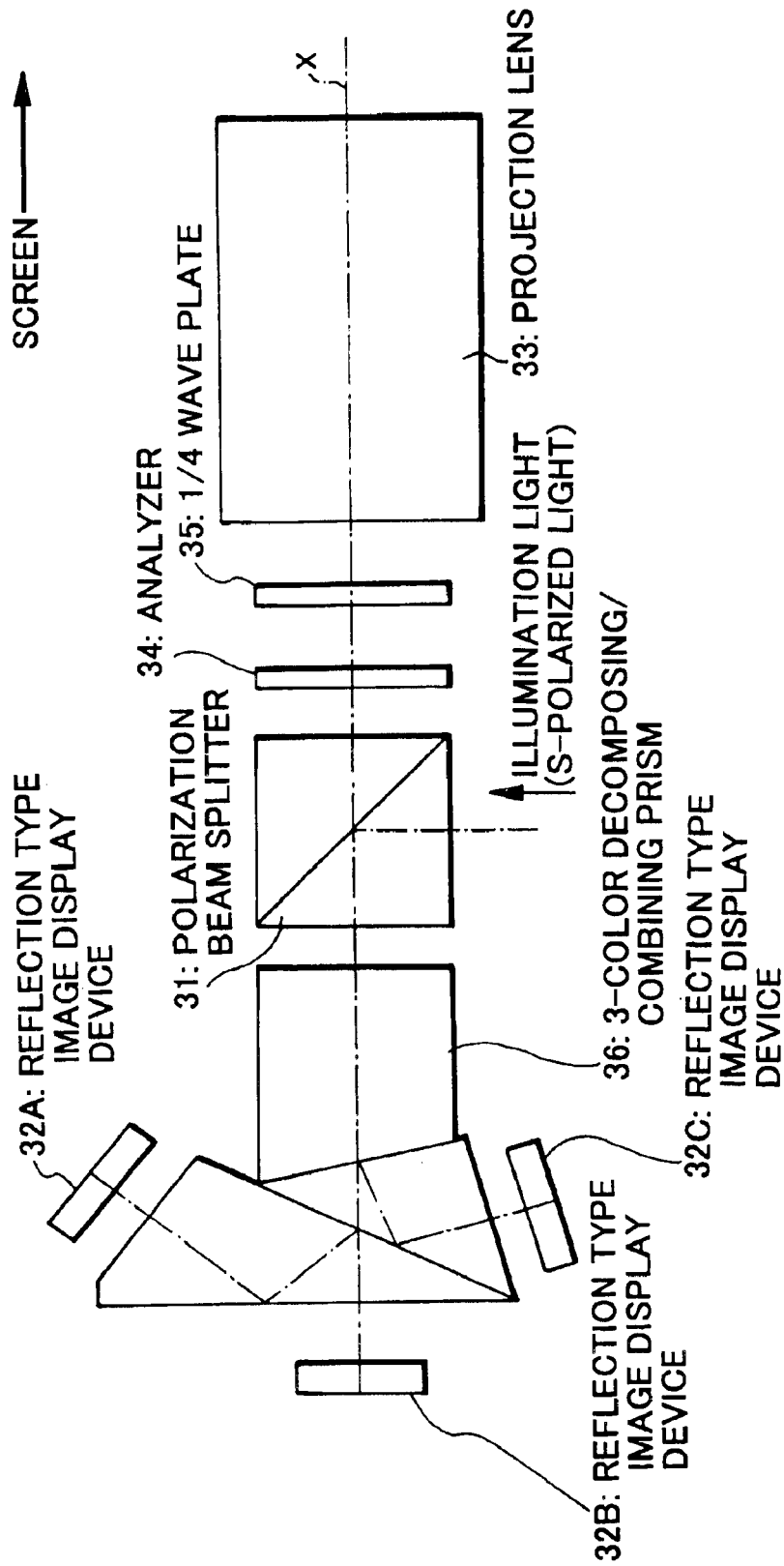
FIG. 2 is a schematic view showing a main part of a projection type image display apparatus in accordance with prior art.

FIG. 1 is a schematic view showing a main part of a projection type image display apparatus which is an example of the present invention. This apparatus comprises a light source 16; a field-sequential color-decomposing illumination optical system 17 for converting illumination light from the light source 16 into color-sequential light components of three primary colors (R, G, B); a PBS (polarization beam splitter) 11 for reflecting S-polarized light and transmitting P-polarized light therethrough; a ferroelectric reflection-type liquid crystal display device 12 which receives the S-polarized light (illumination light) from the PBS 11 and, in response to an image input signal, turns ON pixels in areas with a higher luminance (white image areas) so as to convert the S-polarized light into P-polarized light and output the resulting P-polarized light, while turning OFF pixels in areas with a lower luminance (black image areas) so as to output the S-polarized light as it is, thereby carrying out optical modulation; a projection lens 13 for projecting a projection image onto a screen which is not depicted; and an analyzer 14 disposed immediately in front of the projection lens 13 in order to enhance the contrast.

The conventional projection type image display apparatus inevitably increases its weight and cost since it uses three image display devices and employs a color-decomposing/combining prism in addition to a polarization beam splitter. In the above-mentioned apparatus in accordance with an embodiment of the present invention, a ferroelectric reflection-type liquid crystal display device having a high response speed is used as an image display device, and is combined with a field-sequential color-decomposing illumination optical system 17, whereby the image display device can be constituted by a single member, which reduces the manufacturing cost. The field-sequential color-decomposing illumination optical system 17 is usually formed from a member such as a color wheel or ColorSwitch (registered trademark), which can greatly reduce its weight as compared with a member constituted by a glass block such as a color-decomposing/combining prism. Here, the color wheel is a member in which three sectored areas equally dividing a disk into three are formed with color filters corresponding to respective color light components, so that illumination light sequentially irradiating the color filters is turned into color light changing with time. ColorSwitch (registered trademark) is a semiconductor device having a similar function, and is adapted to selectively output P-polarized light and S-polarized light for each of three colors. When employed as light for irradiating the PBS 11, the S-polarized light may selectively be used alone for each color light component.

In the apparatus of this example, each illumination color light component set to S-polarized light entering the PBS 11 is bent by the reflecting surface of the PBS 11 toward the ferroelectric reflection type liquid crystal display device 12, so as to be made incident on the ferroelectric reflection type liquid crystal display device 12 while in the state of S-polarized light.

As mentioned above, the ferroelectric reflection type liquid crystal display device 12 converts the S-polarized light in areas with a high luminance (white image areas) into P-polarized light and outputs the resulting P-polarized light, but outputs the S-polarized light as it is in areas with a low luminance (black image areas). Therefore, the illumination light turned into substantially P-polarized light upon receiving an optical rotation at white-displaying pixels passes through the PBS 11 as normal projection light, whereas the illumination light still in the S-polarized state from black-displaying pixels is reflected by the PBS 11 toward the illumination system. Hence, only P-polarized light beams from the white-displaying pixels enter the projection lens 13 as normal projection light. Since light beams other than the P-polarized light components are slightly mingled in the light beams transmitted through the PBS 11 as mentioned above, however, the analyzer 14 disposed downstream the PBS 11 is used for yielding purer P-polarized light.

Since the surface of the projection lens 13 is provided with an antireflection coat in general, most of the normal projection light reaches the screen without being reflected. However, it is quite difficult for the antireflection coat to completely eliminate surface reflection. Therefore, return light exists though slightly, which flowers the above-mentioned contrast. Namely, it yields the problem of stray light in the prior art as mentioned above.

Therefore, in this example, a quarter wave plate 15 is disposed downstream the analyzer 14. When the P-polarized light from the analyzer 14 is transmitted through the quarter wave plate 15, it is converted into circularly polarized light. The above-mentioned return light reflected by the lens surface (arbitrary reflecting surface 13A) of the projection lens 13 returns toward the quarter wave plate 15 while still in the circularly polarized state. When the return light passes through the quarter wave plate 15 again, the circularly polarized light is converted into S-polarized light. Thus S-polarized return light is absorbed by the analyzer 14 when entering the latter. This is because of the fact that the analyzer 14 acts to transmit only the P-polarized light therethrough. Since the return light from the lens surface of the projection lens 13 causing stray light is absorbed by the analyzer 14 as such, the stray light can be restrained from occurring.

In particular, since a ferroelectric reflection-type liquid crystal display device receiving attention in terms of high response speed and high reflectivity is used as the above-mentioned reflection type image display device, the influence caused by the stray light may become a large problem. Hence, practical effects become higher when the ferroelectric liquid crystal display device is used.

In the upper part of FIG. 1, the state of polarization of projection light (including return light) at each position of the optical system is shown in the form of chart.

The S-polarized light as illumination light incident on the PBS 11 may be generated within, upstream, or downstream the field-sequential color-decomposing illumination optical system 17. For example, though the illumination light is set to S-polarized light beforehand in the above-mentioned example, it may be configured so as to be initially turned into linearly-polarized light by a polarization-separating film of the PBS. The illumination light to the image display device can be turned into P-polarized light when reflection characteristics of the polarization-separating film and conditions under which the reflection type image display device attains the ON state are adjusted. This case can similarly restrain stray light from occurring.

Without providing the PBS 11, the illumination light may directly be made obliquely incident on the ferroelectric reflection-type liquid crystal display device 12 in the above-mentioned example.

As explained in the foregoing, the projection type image display apparatus of the present invention uses a ferroelectric reflection-type liquid crystal display device having a high response speed as the image display device, and combines it with a field-sequential color-decomposing illumination optical system, so that the image display device can be constructed by a single member, whereby the manufacturing cost is reduced. The field-sequential color-decomposing illumination optical system is usually formed from a member such as a color wheel or Color Switch (registered trademark), which can greatly reduce the weight as compared with a member constructed by a glass block such as color-decomposing/combining prism or the like. Also, it can display an image with a high contrast.

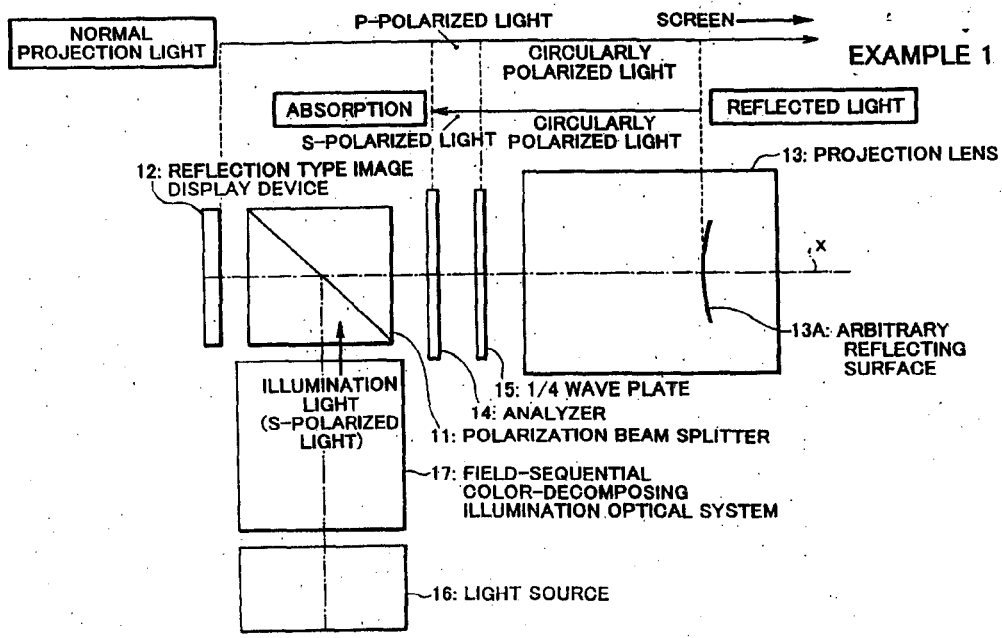

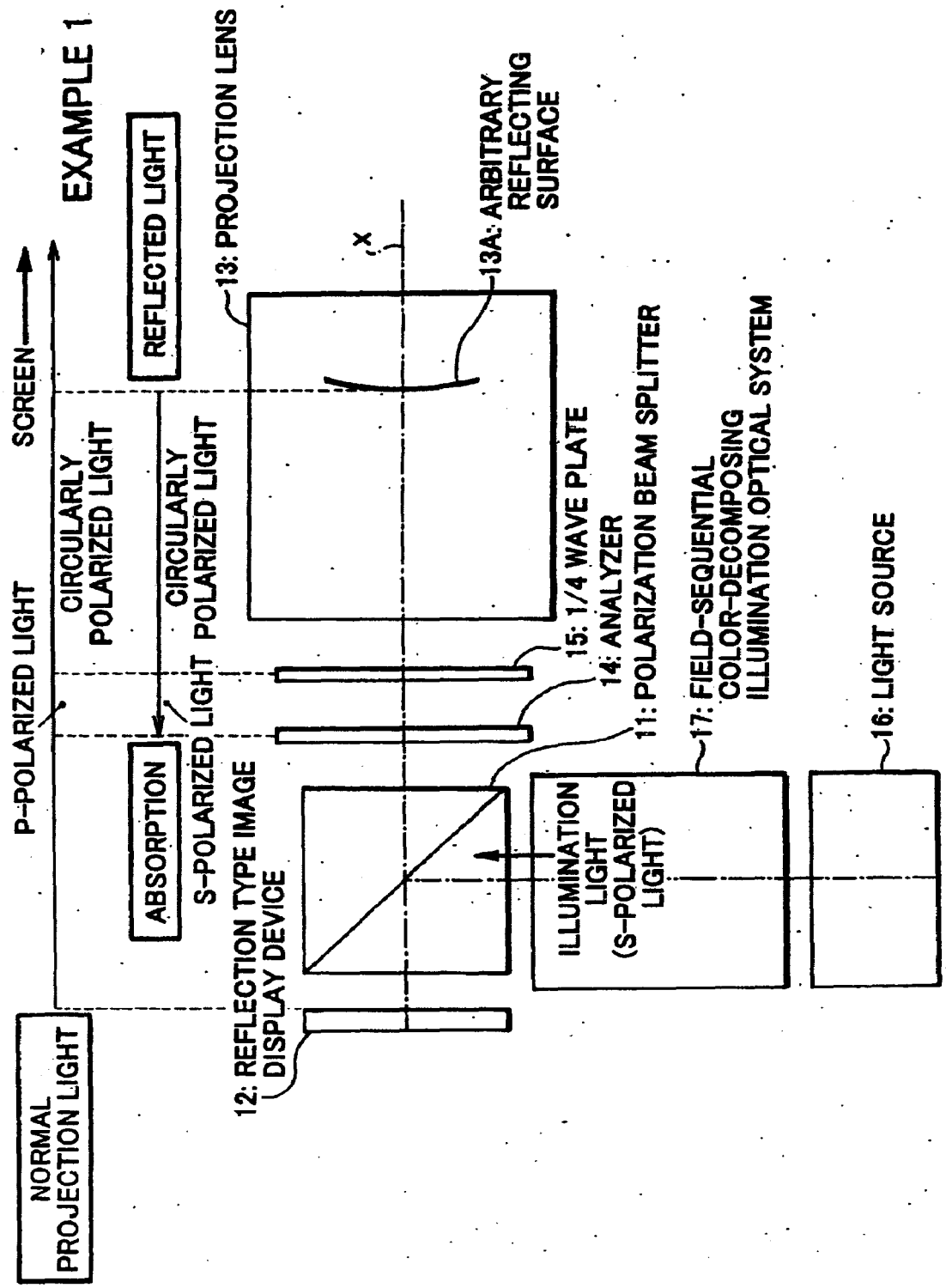

What is claimed is:
1. A projection type image display apparatus which projects, under magnification by using a projection lens, image information carried by a luminous flux emitted from a reflection type image display device;

wherein said reflection type image display device is a ferroelectric liquid crystal display device;

wherein said apparatus comprises a field-sequential color-decomposing illumination optical system for generating illumination color light for irradiating said ferroelectric liquid crystal display device; and wherein an analyzer and a quarter wave plate are arranged between said ferroelectric liquid crystal display device and said projection lens successively from said ferroelectric liquid crystal display device side.

2. A projection type image display apparatus according to claim 1, wherein a polarization beam splitter is disposed between said ferroelectric liquid crystal display device and said analyzer.

3. A projection type image display apparatus according to claim 2, wherein said polarization beam splitter is configured so as to reflect S-polarized light and transmit P-polarized light therethrough.

4. A projection type image display apparatus according to claim 1, wherein, in a space between said ferroelectric liquid crystal display device and said analyzer, said illumination color light is made obliquely incident on said ferroelectric liquid crystal display device.

5. A projection type image display apparatus according to claim 1, wherein said field-sequential color-decomposing illumination optical system is color wheel means or color switch means.

* * * * *

UNITED STATES PATENT AND TRADEMARK OFFICE
CERTIFICATE OF CORRECTION

PATENT NO. : 6,853,363 B2
APPLICATION NO. : 10/094003
DATED : February 8, 2005
INVENTOR(S) : Kazuya Yoneyama and Yasuyuki Miyata It is certified that error appears in the above-identified patent and that said Letters Patent is hereby corrected as shown below:

In the Drawings
Delete Figure 1 and substitute therefore Figure 1 as shown on the attached sheet.

Signed and Sealed this

Third Day of October, 2006

JON W. DUDAS
*Director of the United States Patent and Trademark Office*

(12) United States Patent
Yoneyama et al.

(10) Patent No.: US 6,853,363 B2
(45) Date of Patent: Feb. 8, 2005

(54) PROJECTION TYPE IMAGE DISPLAY APPARATUS

(75) Inventors: Kazuya Yoneyama, Saitama (JP); Yasuyuki Miyata, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 325 days.

(21) Appl. No.: 10/094,003

(22) Filed: Mar. 11, 2002

(65) Prior Publication Data

US 2002/0135540 A1 Sep. 26, 2002

(30) Foreign Application Priority Data

Mar. 13, 2001 (JP) .................................. 2001-070445

(51) Int. Cl.[7] .......................... G09G 3/36; G09G 3/12; G02F 1/1335; G02B 26/08
(52) U.S. Cl. ................... 345/97; 345/32; 349/9; 349/100; 359/301
(58) Field of Search ............. 345/1.1–1.3, 4, 345/30, 32, 55, 84, 87, 88, 97, 690, 697, 102; 349/5, 7–9, 57, 61, 62, 64, 65, 78, 80, 81, 96–100, 104; 359/246, 247, 251, 263, 267, 272, 292, 301, 302, 308–310

(56) References Cited

U.S. PATENT DOCUMENTS

| | | | |
|---|---|---|---|
| 5,565,933 A | * 10/1996 | Reinsch | 348/742 |
| 6,262,851 B1 | * 7/2001 | Marshall | 359/634 |
| 6,340,230 B1 | * 1/2002 | Bryars et al. | 353/31 |
| 6,390,626 B2 | * 5/2002 | Knox | 353/20 |
| 6,624,862 B1 | * 9/2003 | Hayashi et al. | 349/119 |
| 6,650,377 B2 | * 11/2003 | Robinson et al. | 349/9 |

FOREIGN PATENT DOCUMENTS

JP          8-271855          10/1996

* cited by examiner

*Primary Examiner*—Bipin Shalwala
*Assistant Examiner*—Jeff Piziali
(74) *Attorney, Agent, or Firm*—Snider & Associates; Ronald R. Snider

(57) ABSTRACT

A projection type image display apparatus projects, under magnification by using a projection lens, image information carried by a luminous flux emitted from a ferroelectric liquid crystal display device. A field-sequential color-decomposing illumination optical system generates illumination color light for irradiating the ferroelectric liquid crystal display device. An analyzer and a quarter wave plate are arranged between the ferroelectric liquid crystal display device and the projection lens successively from the ferroelectric liquid crystal display device side.

5 Claims, 2 Drawing Sheets